US005078263A

United States Patent [19]

Thompson et al.

[11] Patent Number: 5,078,263

[45] Date of Patent: Jan. 7, 1992

[54] WEB-STEERING MECHANISMS

[75] Inventors: Philip R. Thompson, Harpenden; Michael G. Ladell, Aspley Guise, both of England

[73] Assignee: Xerox Corporation, Stamford, Conn.

[21] Appl. No.: 206,782

[22] Filed: Jun. 15, 1988

[30] Foreign Application Priority Data

Jun. 26, 1987 [GB] United Kingdom ................ 8715013

[51] Int. Cl.[5] ................ B65G 39/16

[52] U.S. Cl. ................ 198/807; 198/806; 474/102

[58] Field of Search ................ 198/806, 807; 474/103, 474/106, 102, 104; 355/3 BE, 16

[56] References Cited

U.S. PATENT DOCUMENTS

| | | | |
|---|---|---|---|
| 3,368,665 | 2/1968 | Jinkins | 198/806 |
| 4,286,706 | 9/1981 | Lastelli et al. | 198/806 |
| 4,369,878 | 1/1983 | Millevoi | 198/807 |
| 4,429,985 | 2/1984 | Yokata | 355/3 BE |
| 4,462,676 | 7/1984 | Shirmura et al. | 355/3 BE |
| 4,527,686 | 7/1985 | Satoh | 198/807 |
| 4,674,858 | 6/1987 | Nagayama | 355/3 BE |

FOREIGN PATENT DOCUMENTS

| | | | |
|---|---|---|---|
| 0071407 | 4/1985 | Japan | 198/807 |
| 0027209 | 2/1987 | Japan | 198/807 |
| 0583046 | 12/1977 | U.S.S.R. | 198/806 |

*Primary Examiner*—Robert P. Olszewski
*Assistant Examiner*—James R. Bidwell
*Attorney, Agent, or Firm*—H. Fleischer; J. E. Beck; R. Zibelli

[57] ABSTRACT

A web-steering mechanism, particularly for the endless belt of a xerographic copier, uses two rolls to hold the belt under tension. An idler roll is designed to rotate about an axis which is at a small angle to a tilt axis of the idler roll assembly. Small tilting movements of the idler roll assembly, under the control of a servo-motor are effective to alter the angle at which the web enters and/or leaves the roll, to cause the web to walk along the tilted roll.

2 Claims, 3 Drawing Sheets

WEB-STEERING MECHANISMS

This invention relates to mechanisms for steering traveling webs or endless belts. When a web is entrained over a roll, it is possible to adjust the angle at which the web enters and leaves the roll, to cause the web to 'walk' along the axis of the roll, by tilting the roll. This control is known in the art as 'soft axis steering'. A web-steering mechanism of this type is frequently employed in an electrophotographic printing machine wherein it is necessary to control the lateral movement of a photoconductive belt.

In an electrophotographic printing machine, a photoconductive belt is charged to a substantially uniform potential to sensitize the surface thereof. The charged portion of the photoconductive belt is exposed to a light image of an original document being reproduced. Exposure of the charged photoconductive belt selectively dissipates the charge thereon in the irradiated area. This records an electrostatic latent image on the photoconductive belt corresponding to the informational areas contained within the original document being reproduced. After the electrostatic latent image is recorded on the photoconductive belt, the latent image is developed by bringing a developer mixture of carrier granules and toner particles into contact therewith. The toner particles are attracted from the carrier granules to the latent image forming a toner powder image on the photoconductive belt. The toner powder image is then transferred from the photoconductive belt to a copy sheet. Finally, the copy sheet is heated to permanently affix the toner particles thereto in image configuration.

Since the photoconductive belt passes through many processing stations during the printing operation, lateral alignment thereof is critical and must be controlled within prescribed tolerances. As the belt passes through each of the processing stations, the location of the latent image must be precisely defined in order to optimize the operations relative to one another. If the position of the latent image deviates from processing station to processing station, copy quality may be significantly degraded. Hence, lateral movement of the photoconductive belt must be minimized so that the belt moves in a pre-determined path.

It is well known that if the belt were perfectly constructed and entrained about perfectly cylindrical rollers mounted and secured in an exactly parallel relationship with one another, the velocity vector of the belt would be normal to the longitudinal axis of the roller and there would be no lateral movement of the belt. However, in actual practice this is not feasible. Due to imperfections in the system geometry, the belt velocity vector is not normal to the roller axis of rotation, and the belt will move laterally relative to the roller until reaching a kinematically stable position. Hereinbefore, lateral movement of a photoconductive belt has been controlled by crowned rollers, flanged rollers or servo systems. Frequently, high local stresses are produced on the belt edges by flanged devices resulting in buckling of the highly sensitive photoconductive belt edges. Servo systems using steering rollers to maintain lateral control of the belt generally apply less stress to the side edges thereof. For example, U.S. Pat. No. 3,435,693 describes a belt entrained about a plurality of spaced rollers. One end of the rollers are journalled in a pivotable frame. A sensing member is forced to the right by the laterally moving belt. A linkage connects the sensing member to the frame. If the belt engages the sensing member, the linkage rotates the frame to a position where the belt will track away from the sensing member until equilibrium is achieved. U.S. Pat. No. 3,500,694 describes a belt tracking system in which a sensing finger detects lateral movement of the belt and actuates a control motor. The control motor rotates a cam shaft which rotates a cam mechanism to pivot a steering roller so as to return the belt to the desired path of travel. U.S. Pat. No. 3,540,571 discloses a belt tracking mechanism having a washer journalled loosely on the steering roller shaft. A pressure roller contacts the washer. The pressure roller is mounted on a pivotable rod and connected pivotably to a servo arm. The servo arm is connected pivotably to the frame Horizontal motion of the belt causes the pressure roller to move horizontally, which in turn, causes vertical motion of the servo arm causing the steering roller to pivot so as to restore the belt to the desired path of movement. U.S. Pat. No. 3,698,540, U.S. Pat. No. 3,702,131, and U.S. Pat. No. 3,818,391 describe a belt steering apparatus employing a disc mounted loosely on one end of a belt support roller. The disc is connected to a linkage which pivots one of the other support rollers. Lateral movement of the belt causes the disc to translate pivoting the linkage, which, in turn, pivots the other support roller returning the belt to the pre-determined path of movement. Research Disclosure, May 9, 1976, No. 14510, page 29 describes a passive web tracking system. The web is supported in a closed loop path by a plurality of supports. The supports include a first roller. The first roller is pivotable to align its axis of rotation to the normal direction of travel of the web. Flanges, which are fixed, engage the side edges of the web preventing lateral movement thereof. A second roller, spaced from the first roller, is rotated about its mid-point by a self aligning radial ball bearing. A yoke supports the second roller pivotably. Movement of the roller is limited to rotation about a castering axis and a gimbal axis by a flexure arm. This permits the web to change direction providing uniform tension in the web span.

As typified by the exemplary systems, various types of servo systems have been devised to control lateral movement of a belt. The following disclosures appear to be relevant: U.S. Pat. No. 4,429,985, Patentee: Yokota, Issued: Feb. 7, 1984; U.S. Pat. No. 4,462,676, Patentee: Shimura et al., Issued: July 31, 1984; U.S. Pat. No. 4,527,686, Patentee: Satoh, Issued: July 9, 1985; U.S. Pat. No. 4,674,858, Patentee: Nagayama, Issued: June 23, 1987.

U.S. Pat. No. 4,429,985 discloses an apparatus for sensing and correcting deviation of an endless record belt. Deviation of the belt from its intended path is detected optically, the deviation signal being used to pivot a roll, about which the belt is entrained, about an axis perpendicular to its rotary axis, so as to apply differential tension to the belt to cause it to move along the pivoted roll.

U.S. Pat. No. 4,462,676 describes a skew control apparatus for an endless belt recording member. The belt is supported by a drive roller and a driven roller. One end of the driven roller is moved vertically, in the appropriate direction when skew is detected.

U.S. Pat. No. 4, 527,686 discloses a deflection correction apparatus for an endless belt. Optical sensors detect deflection of the belt and a cam tilts a tension roll to correct the deflection Movement of a cam lever causes a mavable plate to rotate about the tension roll shaft, thereby moving the tension roll vertically to induce correcting forces in the belt.

U.S. Pat. No. 4,674,858 describes a belt photoreceptor on a frame of support rollers. The roller shafts are spring-biased apart to place the belt under tension. The rollers are movable towards each other for removal of the belt.

In accordance with one aspect of the present invention, there is provided an apparatus for steering a moving web. The apparatus includes an idler roll adapted to be rotated by the moving web. The web has parallel edges and is partially wrapped around the roller. A shaft has the idler roll mounted for relative rotation thereon about a rotary axis. The shaft has a tilt axis which intersects the rotary axis in the region of the center of the idler roll. Means pivot the shaft about the tilt axis in a direction necessary for causing the web to walk along the idler roll.

Other features of the present invention will become apparent as the following description proceeds and upon reference to the drawings, in which.

Although the present invention is applicable to steering a continuous web, as in paper handling equipment, in a preferred embodiment of the invention it is used to steer an endless belt functioning as the photoreceptor of a xerographic copier. In such a copier, a belt of suitable photoconductive material is loosely positioned in a housing which can be placed on, and removed from, the copier as necessary. Projecting from the body of the copier is cantilevered structure presenting two rolls which are roughly parallel to each other, and which are intended to extend into the interior of the belt when the housing has been put in position on the copier. After this has happened, the two rolls are biased resiliently apart so as to place the belt under tension. One of the rolls has a fixed axis and is intended to be driven at a set speed. The other roll is an idler roll, and has its axis of rotation adjustable with respect to the axis of the driver roll. The belt material is so thin that the position of the belt on the rolls cannot be adjusted by means of a mechanical follower bearing on one or both edges of the belt, because the friction and pressure applied by such an edge follower would result in the belt edge becoming damaged.

Accordingly, the present invention aims at controlling the position of an endless belt by monitoring the position of a belt edge in a non-contact manner to derive a signal which is used to tilt the idler roll in a direction so as to cause the belt to walk along the idler roll in the appropriate direction until it reaches its intended working position in which the reference edge of the belt lies in a chosen location.

Figure 1:
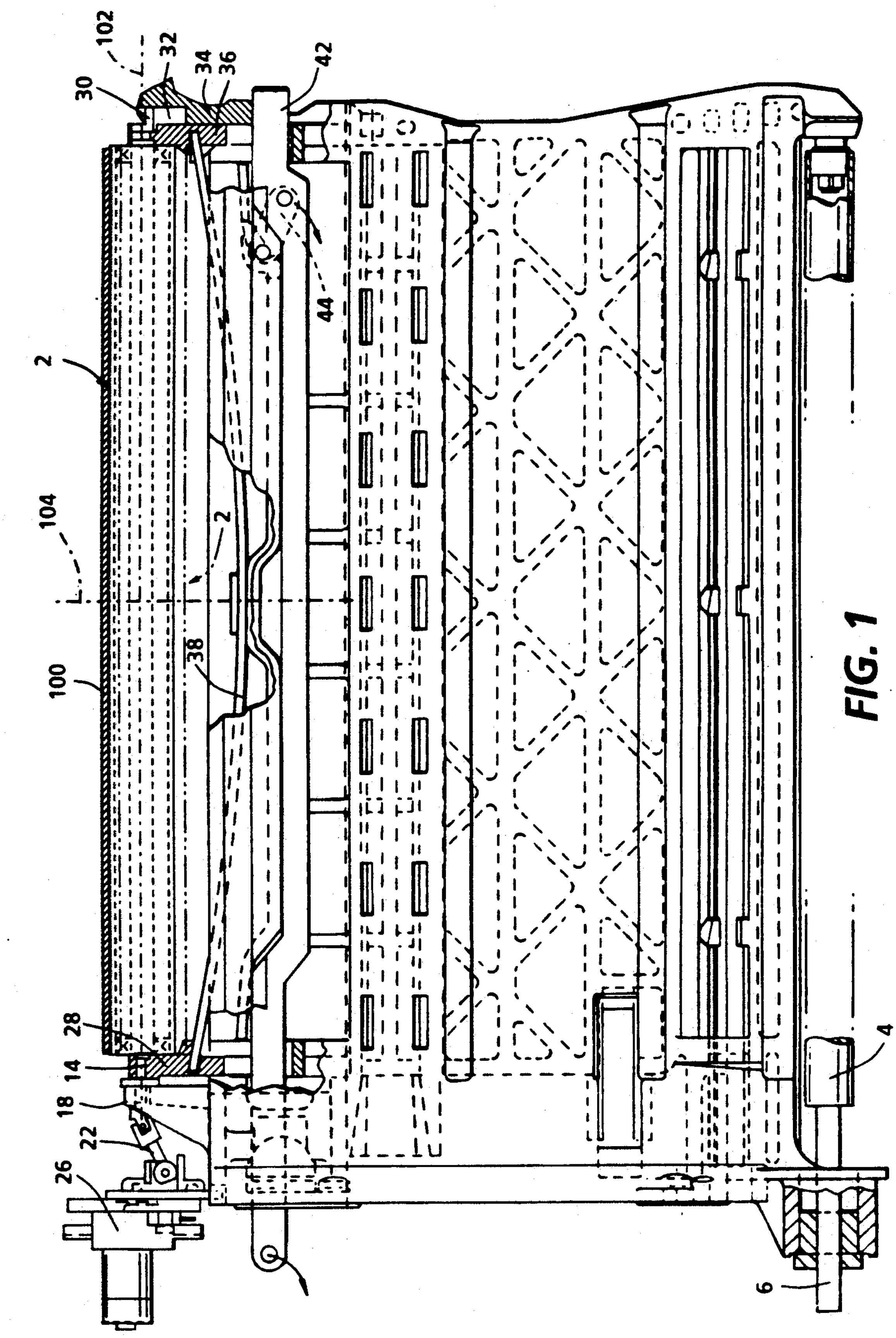
FIG. 1 is a plan view of the present invention for steering an endless belt supported by two rolls adapted to tension and drive the belt.
Figure 2:
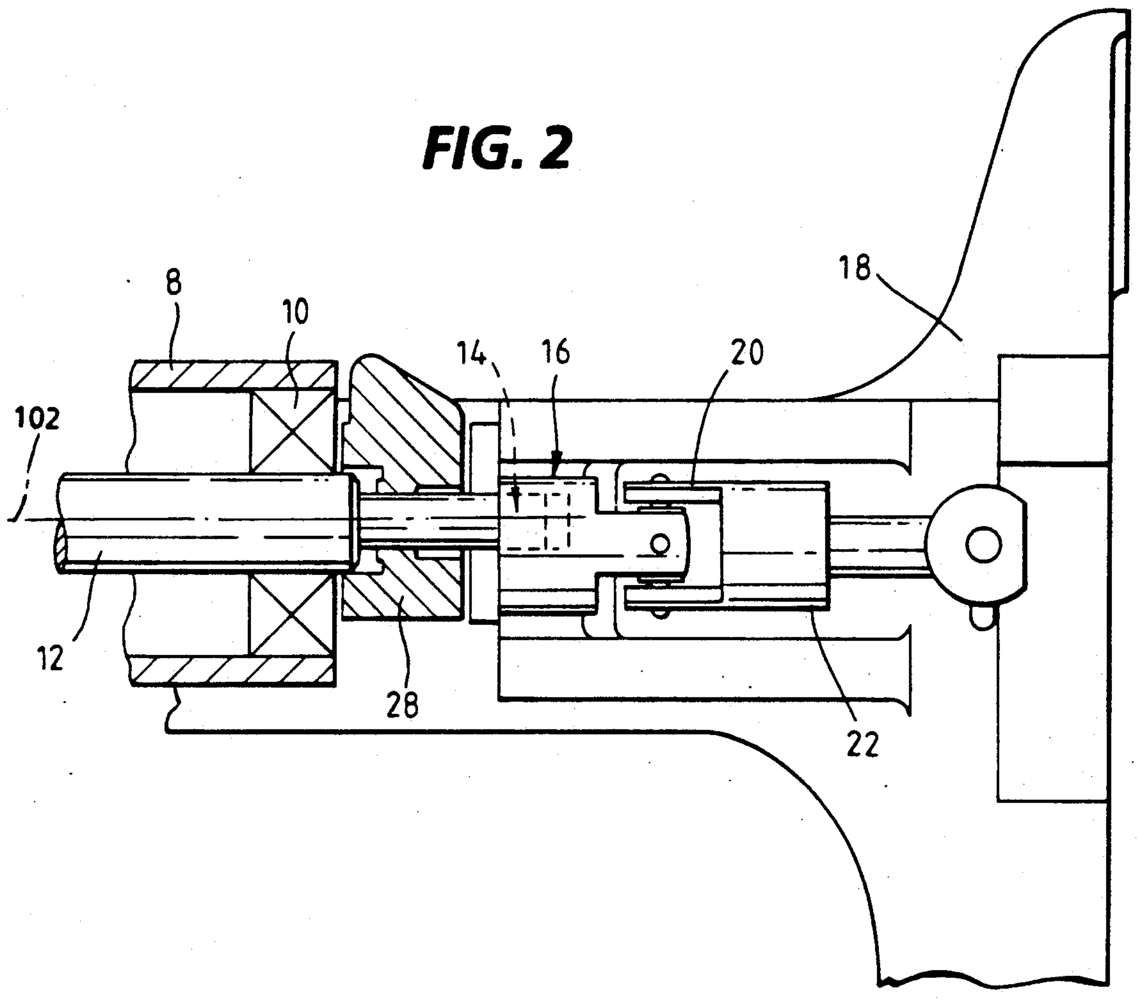
FIG. 2 is an enlarged, fragmentary elevational view of one end of the idler roll shown in FIG. 1.

In FIG. 1, the roll 2 shown in the upper part of the Figure is the idler roll over which a belt 100 is entrained. The driven roll 4 is shown in the lower part of the Figure, and is driven by a motor (not shown) operating on shaft 6. As can be seen more clearly in FIGS. 2 and 3, the idler roll includes a hollow sleeve 8 having at each end a set of suitable bearings 10 mounted on a shaft 12 of which the angular position is adjustable incrementally. Coaxial with shaft 12, at the left-hand end as viewed in FIG. 1, is a stub shaft 14 having its outer end housed in a recess positioned eccentrically of the rotary axis of a guide fork 16 mounted on a support member 18. The fork is adapted to be rotated in the appropriate sense, and by a chosen amount, by virtue of its engagement with a universal joint 20 having its rotary position dictated by a shaft 22 driven through a gearing mechanism 24 (shown in FIG. 4) by an electric motor 26.

Bearing on the stub shaft 14, between the bearings 10 and the guide fork 16, is a thrust bearing 28.

Figure 3:
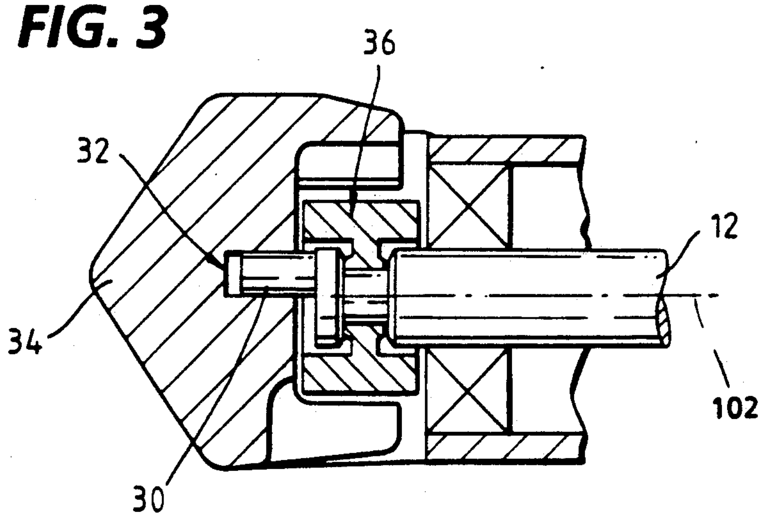
FIG. 3 is an enlarged, fragmentary elevational view of the other end of the idler roll shown in FIG. 1.

Positioned at the other end of the idler roll is a stub shaft 30 rotatable in a groove 32 in a fixed support 34. The stub shaft 30 is integral, or is otherwise movable, with respective end of shaft 12, and is positioned such that it is displaced by 180° from the effective axis of rotation of the shaft at the other end thereof. The stub shaft 30, or some other part of shaft 12, is engaged by a thrust bearing 36 (FIG. 3). As can be seen most clearly in FIG. 1, both thrust bearings 28 and 36 are engaged by a bowed spring 38 held at its center and having its outer ends flexed into contact with the thrust bearings. The spring 38 is designed to force the thrust bearings, and with them the idler roll, bodily into contact with the inside surface of the belt, so that the spring 38 takes up any slack in the belt, ensuring that it is in frictional driving engagement with roller 4. This relative translation of the idler roll is accommodated by ensuring that the guide fork 16 and the stub shaft 30 are mounted in parallel-sided grooves in the respective support members 34 and 18.

As will be appreciated, as the shaft 12 is rotated incrementally by operation of motor 26, the rotary axis 102 of the sleeve 8 tilts about tilt axes 104 by an amount which depends on the extent by which shaft 12 had been rotated, which in turn is a function of the length of the shaft and the degree of eccentricity provided by stub shaft 30 and guide fork 16. Rotary axis 102 and tilt axis 104 intersect in the region of the center of roller 2. In the neutral steering position, the two oppositely-directed 'throws' are in the plane which contains both rotary axes. The planar 'tilt' which this would otherwise induce in the idler roll is nullified by the belt tension forcing the stub shaft 30 and guide fork 16 to move against the force of spring 38 to a position in which both rotary axes are parallel. When it is necessary to drive (or 'steer') the belt along the rolls, then shaft 12 is rotated so that it tilts so as to lie at a small adjustable angle to the common plane containing the axis of the drive roll, causing the belt to walk along the length of the idler roll. When it has reached its intended central position, the tilt is removed, by rotation of coupling 20, to restore the parallelism of the roll axes.

In one embodiment of the present invention, the position of an edge of the belt is detected by two photodetectors, provided by lamps aligned with photodiodes. In the intended operating position of the belt, the lamps and photodiodes can be positioned so that either one diode is receiving light and the other is not, or both diodes are receiving light. When the belt moves along the length of both rolls it reaches a position in which the light to one of the photodiodes is cut off by being intercepted by an edge of the belt. This reduction or cessation of the electrical signal from the respective diode is detected and used to generate a signal driving the servo motor 26 so as to induce a degree of tilt in the idler roll, and in the appropriate direction, to cause the belt to reverse its motion along the axes of the rolls, so that it starts to move back to its intended position until it uncovers the obturated photodiode. The manner in which the interruption of the flow of light to the photodiodes is used to generate a correction signal does not form part of the subject matter of this invention, and so is not described here in any further detail. It is believed that sufficient explanation has been given to a man skilled in the art of designing servo-control systems as to enable him to design a system operating as described.

An important aspect of the present invention is the ease with which the idler roll can be retracted to an inoperative position to bring both rolls out of frictional engagement with the belt, to permit the belt to be removed from its drive mechanism, for maintenance or replacement. This is effected by a linear cam 42 which is engaged at two points along its length by means for causing it to move along an arc when a force is applied along the length of the cam. One such pivot arm 44 is shown at the right-hand end of the cam 42 in FIG. 1, with a similar arrangement at the left-hand end not being shown in any detail. However, the lengths of the effective link arms are the same, so that as a force to the left as viewed is applied to cam 42, it pivots in a clockwise direction as viewed. In so doing, surfaces on the cam 42 come into contact with surfaces on the thrust bearings 28 and 36 to force them down by the same amount as each other against the resistance applied by the bowed spring 38. This permits the idler roll to move bodily towards the drive roll, thus freeing the belt so that it is able to be removed from the rolls, to the right as viewed in FIG. 1. After the same or a replacement belt has been placed over the structure shown in FIG. 1, the linear cam 42 is moved back to the position shown in FIG. 1, which allows the respective thrust bearings to move under the action of the spring 38 to the position in which the spring pushes the idler roll against the overlying belt. The original degree of tilt of the idler at the time the cam 42 was operated is restored, because none of the other components affecting the degree of tilt has been moved.

Figure 4:
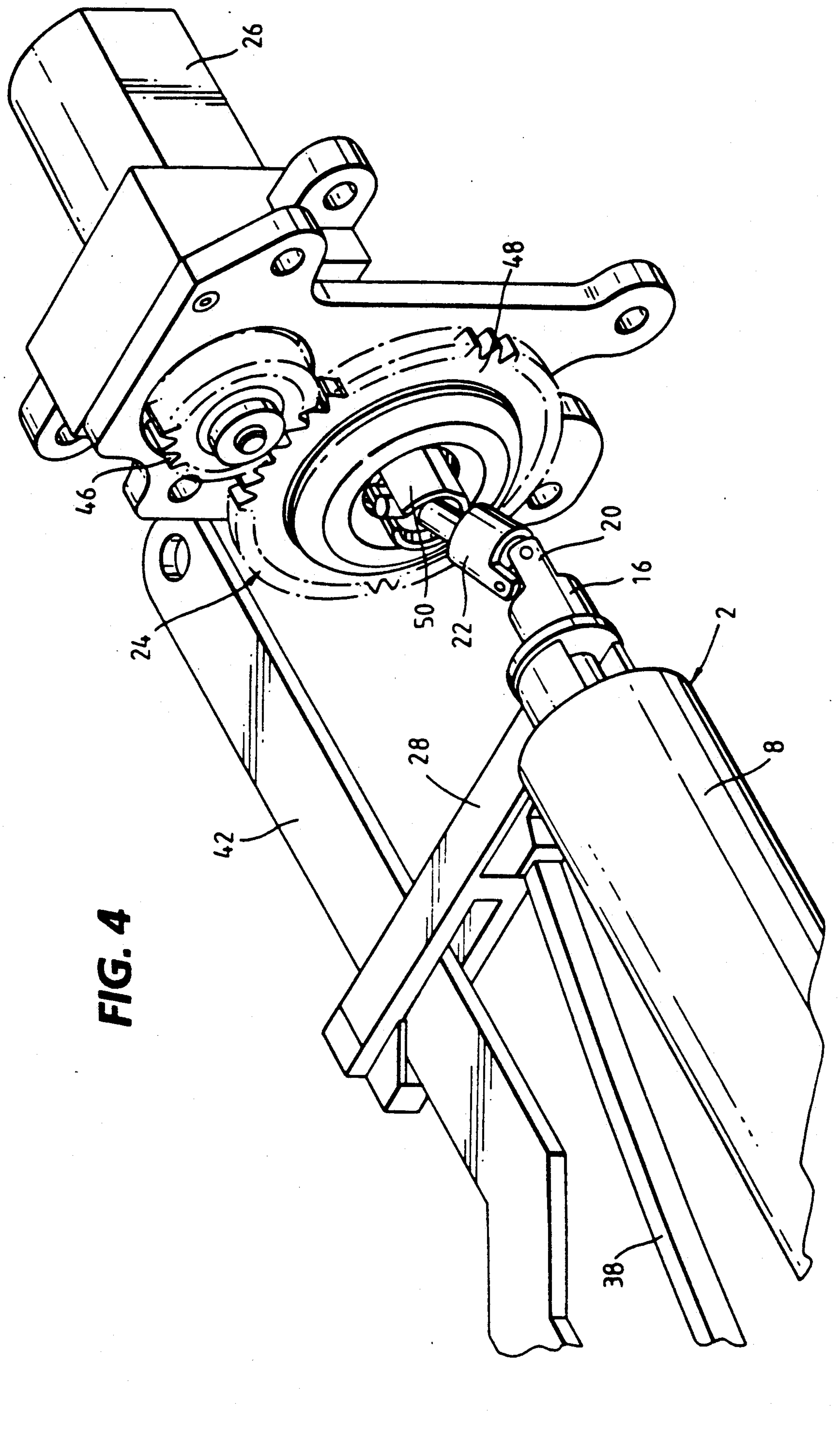
FIG. 4 is an enlarged, fragmentary perspective view of the FIG. 2 end of the idler roll showing the structure for adjusting the angular position of the shaft of the idler roll.

As shown in FIG. 4, the servo-motor 26 drives a gearwheel 46 meshing with a gearwheel 48 to which a slotted sleeve 50 is connected. One end of shaft 22 carries a coupling member which is able to move along the axis of sleeve 50, and from which projects a pin slidable in the slot, but not movable angularly relatively to it, so that rotation of gearwheel 48 and sleeve 50 leads to equal rotation of shaft 22. This in turn leads to rotation of guide 16, which results in an arcuate movement of stub shaft 14, and therefore of this end of the shaft 12. The shaft 14 being secured to guide 16 results in this arcuate movement involving partial rotation of shaft 12 about its axis, which is transferred to the other end of the idler roll, causing its position relative to end support 34 to be adjusted, so that it complements the movement of the one end of the idler roll by contributing to the change in the 'tilt' of the idler roll relative to the driver roll.

It will thus be seen that the present invention provides a 'soft-axis' steering control to web passing over a steerable roll movable bodily about a tilt axis which is at an acute angle to the rotary axis of the roll, so as to alter the angle at which the web enters and leaves the roll.

It is evident that the web or belt steering apparatus of the present invention satisfies the aims and advantages previously set forth. While this invention has been described in conjunction with a specific embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. An apparatus for steering a moving web, including:

an idler roll adapted to be rotated by the moving web, said web being partially wrapped around said roll;

a shaft having said idler roll mounted for relative rotation thereon about a rotary axis, said shaft having a tilt axis which intersects the rotary axis in the region of the center of said idler roll, and a pair of thrust bearings, one of said pair of thrust bearings engaging said shaft at each end thereof, said pair of thrust bearings beings movable in parallel with each other toward and away from said second roll in the plane containing the tilt axis;

means for pivoting the shaft about the tilt axis in a direction necessary for causing the web to walk along said idler roll, said pivoting means includes a first guide, a first stub axle extending outwardly from one end of said shaft and being supported by said first guide, said first stub axle being positioned eccentrically of said first guide, a motor; a universal coupling connecting said first stub axle with said motor to rotate the stub axle incrementally, a second guide, and a second stub axle extending outwardly from the other end of said shaft and being supported by said second guide; and a second roll having the web partially wrapped thereabout with its axis being located in a plane containing the tilt axis, said idler roll being movable from an operative position in driving engagement with the web, to a retracted position in which said idler roll and said second roll are in a non-operative position in non-driving engagement with the web.

2. An apparatus for steering a moving web, including:

an idler roll adapted to be rotated by the moving web, said web being partially wrapped around said roll;

a shaft having said idler roll mounted for relative rotation thereon about a rotary axis, said shaft having a tilt axis which intersects the rotary axis in the region of the center of said idler roll, and a pair of thrust bearings, one of said pair of thrust bearings engaging said shaft at each end thereof, said pair of thrust bearings being movable in parallel with each other toward and away from said second roll in the plane containing the tilt axis;

means for pivoting the shaft about the tilt axis in a direction necessary for causing the web to walk along said idler roll;

a bowed spring having each end thereof engaging one of said pair of thrust bearings to bias said idler roll to the operative position; and means for moving said pair of thrust bearing toward said second roller, against the bias of said bowed spring, to the retracted position in which the web may be removed from said idler roller and said second roller.

* * * * *